(12) United States Patent
Strickland et al.

(10) Patent No.: US 6,334,991 B1
(45) Date of Patent: Jan. 1, 2002

(54) PURIFICATION OF SULFUR BY MEANS OF CENTRIFUGATION

(75) Inventors: Robin Whitney Strickland, New Orleans; Jay Charles Smith, Pearl River, both of LA (US)

(73) Assignee: Freeport-McMoRan Sulphur LLC, New Orleans, LA (US)

( * ) Notice: Subject to any disclaimer, the term of this patent is extended or adjusted under 35 U.S.C. 154(b) by 0 days.

(21) Appl. No.: 09/560,620

(22) Filed: Apr. 28, 2000

(51) Int. Cl.$^7$ .................. C01B 17/02; C01B 17/027
(52) U.S. Cl. ................. 423/578.1; 423/578.2; 210/512.1; 210/787; 210/788; 210/789
(58) Field of Search ............. 423/578.1, 578.2; 210/512.1, 787, 788, 789

(56) References Cited

U.S. PATENT DOCUMENTS

| | | | |
|---|---|---|---|
| 1,318,015 A | * 10/1919 | Sedgewick | |
| 2,915,369 A | * 12/1959 | Oaks et al. | 23/308 |
| 2,941,868 A | 6/1960 | Brogdon et al. | 23/224 |
| 3,042,503 A | 7/1962 | Tuller et al. | 23/310 |
| 3,474,911 A | 10/1969 | Olsen | 210/318 |
| 4,149,836 A | 4/1979 | Price | 425/8 |
| 4,218,411 A | 8/1980 | Price et al. | 264/8 |
| 4,944,769 A | 7/1990 | Garcia et al. | 23/293 |
| 5,071,332 A | 12/1991 | Garcia et al. | 425/6 |

FOREIGN PATENT DOCUMENTS

FR   1023497   * 3/1953 ............. 423/578.1

OTHER PUBLICATIONS

Perry et al. (editors) *Chemical Engineers' Handbook* 5th Ed. McGraw–Hill Book Co. USA, ISBN 0–07–049478–9, p. 21–41.*

* cited by examiner

Primary Examiner—Steven P. Griffin
Assistant Examiner—Timothy C. Vanoy
(74) Attorney, Agent, or Firm—Raél V. Fonte

(57) ABSTRACT

A sulfur purification process is provided. Ash-containing molten sulfur is fed to a centrifuge and subjected to centrifugation under controlled conditions at G forces at least about 4,000 times that of gravity. The centrifugation generates a purified sulfur product and a high-solids sulfur waste stream. A solid bowl disc centrifuge provided with conical discs is used to effect the centrifugal separation of solids from liquids at G forces of at least about 4,000. The centrifuge and related piping system are equipped with heating means so as to maintain the temperature of the sulfur above about 250° F. If large volumes of sulfur are to be treated, e.g., 40 or more long tons per hour, a pretreatment step, where the molten sulfur is first subjected to centrifugation at G forces at least about 4,000 times that of gravity in one or more nozzle bowl centrifuges, is added in order to obtain satisfactory results. In another aspect of the sulfur purification process, the nozzle bowl centrifuge underflow waste stream is further processed in a cyclone-thickener arrangement to obtain a high-solids sulfur waste stream and a moderate-solids sulfur stream which is then mixed with the low-solids sulfur product stream from the nozzle bowl centrifuge(s), or recycled to the feed of the nozzle bowl centrifuge(s).

17 Claims, 4 Drawing Sheets

"DESLUDGER" SOLID BOWL DISC CENTRIFUGE

PURIFICATION OF SULFUR BY MEANS OF CENTRIFUGATION

FIELD OF THE INVENTION

The present invention relates to a process for purifying sulfur. More particularly, the invention is concerned with a novel technique for treating sulfur, having a high content of undesirable solid impurities, to remove such impurities and provide a purified sulfur product. Specifically, this invention relates to a process for purifying sulfur by means of centrifugation.

BACKGROUND OF THE INVENTION

Sulfuric acid is the largest commodity chemical in the world in terms of tonnage, and the great majority of it is produced by the combustion of sulfur in sulfuric acid plants. Historically, mined natural sulfur has been the primary source of commercial sulfur, but this position has given way in recent years to sulfur recovered from crude oil and natural gas processing. Natural sulfur is mined primarily by the Frasch hot water injection process, with much lesser amounts obtained by traditional mining techniques. Recovered sulfur is obtained largely by the treatment of gaseous hydrogen sulfide streams in a Claus Process plant. Regardless of the source of the sulfur, all sulfuric acid plants require clean sulfur to feed to their burners in order to avoid burner fouling. Natural sulfurs contain small amounts of solid impurities from the mining processes. Recovered sulfurs usually contain catalyst fines and, if formed into solid prills, they also contain solid impurities resulting from storage and transfer operations. These solid impurities must be removed prior to combustion in the sulfuric acid plants. Solid prilled sulfur commands a substantial portion of the world sulfur market. A drawback of solid sulfur is its tendency to form sulfuric acid on the surface of the sulfur prills due to natural bacterial action. The sulfuric acid is usually neutralized by the addition of lime to the sulfur. This treatment results in suspending small gypsum particles throughout the molten sulfur, and these particles must also be removed prior to combustion.

Analysis of sulfur for solids involves burning the sulfur to obtain a solid residue, or ash. As a result, the solids impurities in sulfur are often referred to as the "ash content" or, simply, "ash". These solids impurities have a particle size that normally ranges from about 5 to about 100 microns, and are present in sulfur in amounts ranging anywhere from about 10 ppm to as much as 2,000 ppm and higher. The nature, particle size and amount of ash present vary with the source and the history of the sulfur. Salt crystals (sodium or potassium chloride), which comprise a significant portion of run-of-mine Frasch sulfur ash, normally originate from the deposit from which the sulfur is mined, and their presence makes the sulfur unacceptable for many purposes. Calcium sulfate and calcium carbonate are also sometimes present in Frasch sulfur. Components of recovered sulfur ash include calcium sulfate and calcium oxide. In addition, iron sulfides and other iron compounds are often found in both recovered sulfur ash and Frasch sulfur ash as a result of the sulfur coming into contact with iron pipes, tanks and the like. Depending on the type of storage facilities used, both recovered and Frasch sulfur may also contain solids like silica, silicates and other such soil components.

The removal of ash from sulfur for the purpose of improving sulfur purity has been the subject of extensive research, as well as commercial investigations and studies, some more successful than others. Cycloning, washing, adsorption and filtration have been tried by various sulfur producers with varying degrees of commercial success. Since sulfur solidifies at around 240° F., the challenge of successfully purifying it is further burdened by the fact that the purification process usually must be carried out while the sulfur is molten. The difficulties in handling molten sulfur are illustrated in U.S. Pat. Nos. 4,149,836, 4,218,411, 4,944, 769 and 5,071,332, which describe atomizers and granulators for converting molten sulfur into particulate sulfur and granulated sulfur, respectively. These patents, however, do not address the purification of sulfur. U.S. Pat. Nos. 2,941, 868 and 3,042,503 address the purification of sulfur in its molten state by means of further heating and solvent extraction so as to produce a sulfur product of reduced carbon content. These techniques do not address, however, the removal of salt, ash or other such similar solid impurities from the sulfur. U.S. Pat. No. 3,474,911 describes the use of filtration to remove solid impurities from sulfur and provides a solution to one of the shortcomings associated with the use of such filtration systems. In this case, a special filter configuration is needed to detect filter failures and minimize contamination of the filtered product that would occur otherwise. Another shortcoming of sulfur filtration systems is that the sulfur has to be transported to a remote location from where it is produced in order to process it in a separate filtration plant, thus adding transportation and other related expenses to the cost of production.

It is an object of the present invention to provide a process for purifying sulfur with respect to solid impurities.

Another object of this invention is to provide a commercially practicable method and system for treating sulfur in its molten state so as to remove salt, ash and/or similar solid impurities.

An object of the present invention is to provide a practicable technique for purifying sulfur contaminated with solid impurities that is relatively low in equipment cost, as well as in operating and maintenance costs, and which results in insignificant sulfur losses.

A specific object of this invention is to provide a method for purifying sulfur with respect to solid impurities which is not burdened with the shortcomings attendant to filtration and other prior art methods of sulfur purification.

A further object of the present invention is to provide a system for purifying sulfur at the point or location where the sulfur is mined or originally recovered, thereby avoiding or minimizing the costs associated with transportation to and handling of the sulfur in special purification plants.

These and other objects of the invention will be apparent to those skilled in the art from the description that follows.

SUMMARY OF THE INVENTION

The process of the instant invention centers around the innovative use of centrifugation and, in particular, high centrifugal force ("G force") centrifugation under controlled conditions to effectively remove the salt and other components of the ash normally found in commercial sulfurs. The high G force centrifugation is best carried out in a "desludger centrifuge" at a G force (centrifugal force per unit mass) of at least 4,000. (A G force of 1 is the force exerted on a unit mass by the standard gravitational pull of the earth, where the standard acceleration of gravity is 9.80665 meters per second per second, or 32.174 feet per second per second.) Preferably, a G force of between about 4,000 and 12,000 is used.

Centrifugation in this fashion generates a product stream of purified sulfur and a waste stream of high-solids sulfur. A desludger centrifuge is a type of solid bowl disc centrifuge provided with a plurality of conical discs to effect centrifugal separation of solids from liquids at high G forces. An example of a desludger centrifuge is the clarifier centrifuge manufactured by Westfalia Separator AG, of Oelde, Germany, as Model SB 60. A simplified schematic description of a Model SB 60 clarifier centrifuge is shown in FIG. 1. Means for providing heat to the desludger centrifuge so as to maintain the temperature of the sulfur above 250° F. are used to maintain the sulfur in molten state.

To be commercially successful the centrifuge should be able to concentrate the solid impurities in the molten sulfur to a high degree. The solids level in the resulting waste sulfur should be at least 1% by weight (10,000 parts per million by weight, or "ppm"), and preferably at least 5% by weight (50,000 ppm), to minimize sulfur loses. The centrifuge also should be able to routinely discharge the high-solids waste sulfur automatically. High-solids sulfur has very high viscosity. Consequently, increased concentrations of high solids in sulfur would be expected to significantly limit the degree of separation achieved in the centrifuge and to negatively impact the ability of the centrifuge to automatically discharge the waste sulfur. Surprisingly, the process of this invention is able to concentrate solid impurities in the waste sulfur to as high as 35% by weight (350,000 ppm) and still achieve efficient high-solids separation and waste sulfur discharge. The reason for the low-viscosity like behavior of the high-solids sulfur during the high G force centrifugation of this invention is not clearly understood.

If large volumes of sulfur are to be treated, it has been found that a pretreatment step, where the molten sulfur is first subjected to high G force centrifugation in a nozzle bowl centrifuge, yields excellent results. A nozzle bowl centrifuge is a type of solid bowl disc centrifuge provided with a plurality of conical discs to effect centrifugal separation of solids from liquids at high G forces. It is similar to a desludger centrifuge in many respects, but the nozzle bowl centrifuge has multiple nozzles located at the bowl periphery which are used to continuously discharge high-solids waste sulfur. An example of a nozzle bowl centrifuge is the nozzle bowl centrifuge manufactured by Westfalia Separator AG, of Oelde, Germany, as Model SDA 130. The nozzle bowl centrifuge preferably operates at the same, or nearly the same, G-force range described above for the desludger centrifuge. The product sulfur stream from the nozzle bowl centrifuge is comparable in low-ash quality to that obtained from the desludger centrifuge, but the waste underflow stream from the nozzle bowl centrifuge is usually too low in solids content to allow for economical disposal. Instead, it has been found that the waste sulfur stream from the nozzle bowl centrifuge should be further processed, e, g., in a desludger centrifuge, as described above, to produce a second purified sulfur stream and a high-solids waste sulfur that is economical to dispose.

A commercial sulfur purification facility using the process of this invention may consist of one or more nozzle bowl centrifuges and desludger centrifuges, connected in series or in parallel, depending on the required sulfur throughput and the process capacities of the centrifuge(s). The raw sulfur may be fed to the nozzle bowl centrifuge(s), and the waste sulfur stream from the nozzle bowl centrifuge(s) may be further processed in a bank of parallel desludger centrifuges. Alternatively, it may be desirable to forego the nozzle bowl centrifuge(s) and effect the purification process with one or more desludger centrifuges operating in parallel.

Another aspect of the sulfur purification process is that the nozzle bowl centrifuge underflow waste sulfur stream may be further processed in a gravity settler, or a cyclone-gravity settler arrangement, to obtain a high-solids waste sulfur stream and a moderate-solids sulfur stream which then may be mixed with the low-solids product sulfur stream from the nozzle bowl centrifuge, or recycled to the feed of the nozzle bowl centrifuge. This process is generally inferior in solids removal to that achieved by a desludger centrifuge, but may suffice for some scenarios. In this process arrangement the waste sulfur underflow from the nozzle bowl centrifuge is preferably first fed to a cyclone in order to increase the solids density of the underflow and thereby reduce the required size of the gravity settling equipment. The moderate-solids overflow product sulfur stream from the cyclone is returned to the nozzle bowl centrifuge, or it may be mixed with the product sulfur stream from the nozzle bowl centrifuge. The underflow high-solids waste sulfur stream from the cyclone is sent to a gravity settler. The moderate-solids overflow product sulfur stream from the gravity settler is returned to the nozzle bowl centrifuge or blended with the low-solids sulfur stream from the nozzle bowl centrifuge. If the waste sulfur stream from the nozzle bowl centrifuge is very small, the cyclone may be omitted from the process.

DETAILED DESCRIPTION OF THE INVENTION

Figure 1:
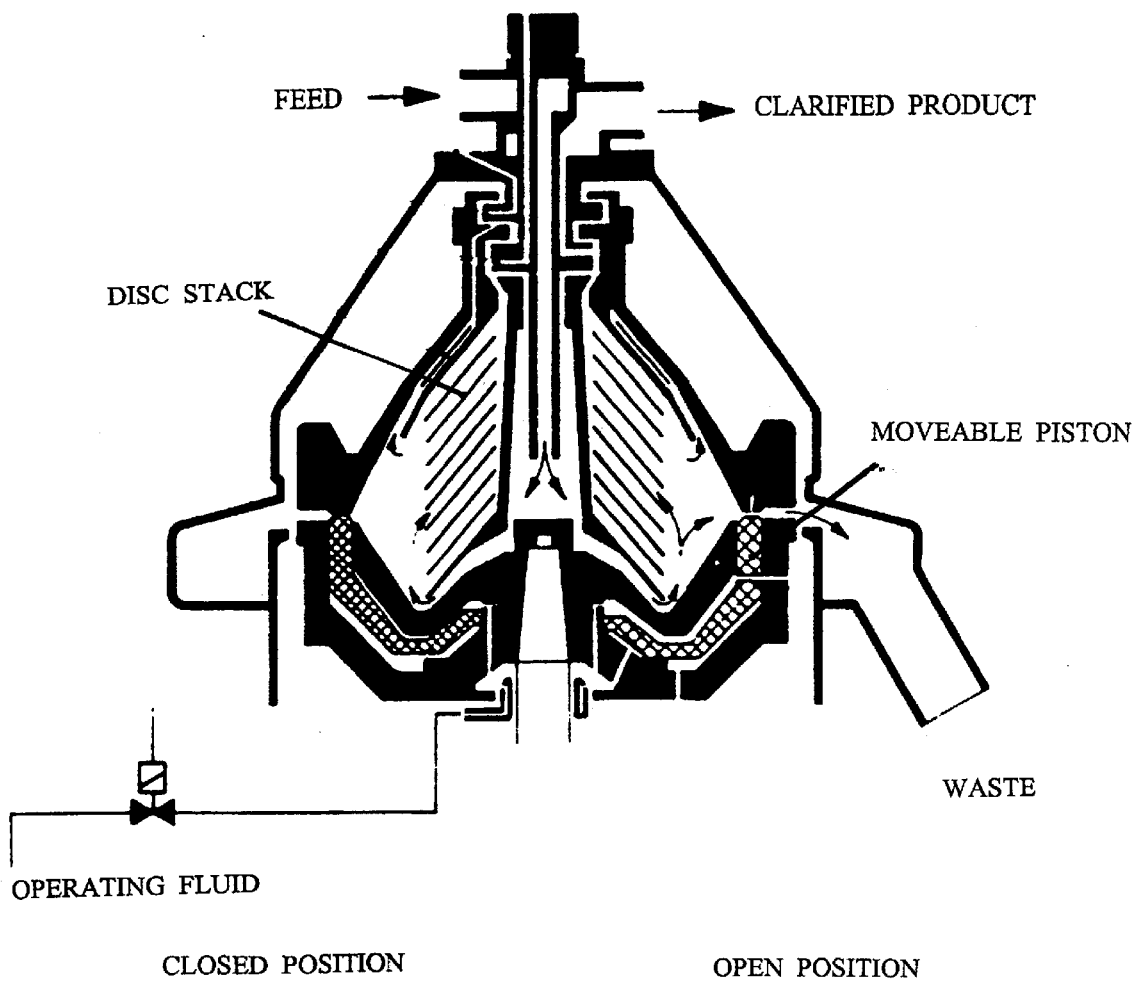
FIG. 1 is a cross sectional view of a desludger centrifuge of the type preferred by the process of this invention. The desludger centrifuge depicted in FIG. 1 is part of the prior art, and no claim is made to its design or configuration.

The process of this invention will be described in conjunction with the appended drawings. Referring first to FIG. 1, raw sulfur to be purified is fed to the Feed port of the centrifuge, from which it flows down the central feed tube and out into the bowl at the bottom of the disc stack. While sulfur is fed to the centrifuge, the Moveable Piston is in the up or closed position, as controlled by the flow of the centrifuge Operating Fluid (usually water), which is delivered to the centrifuge by the action of a solenoid valve. The sulfur flows through the discs, which retain solids more dense than the sulfur. The solids travel to the periphery of the discs and are accelerated to the outermost part of the bowl, where they are collected. The purified sulfur transits the disc stack and exits the centrifuge as the Clarified Product. Periodically, solids are ejected from the centrifuge bowl by briefly opening the Moveable Piston by means of the Operating Fluid. High solids waste sulfur is ejected from the bowl through the Waste port.

Figure 2:
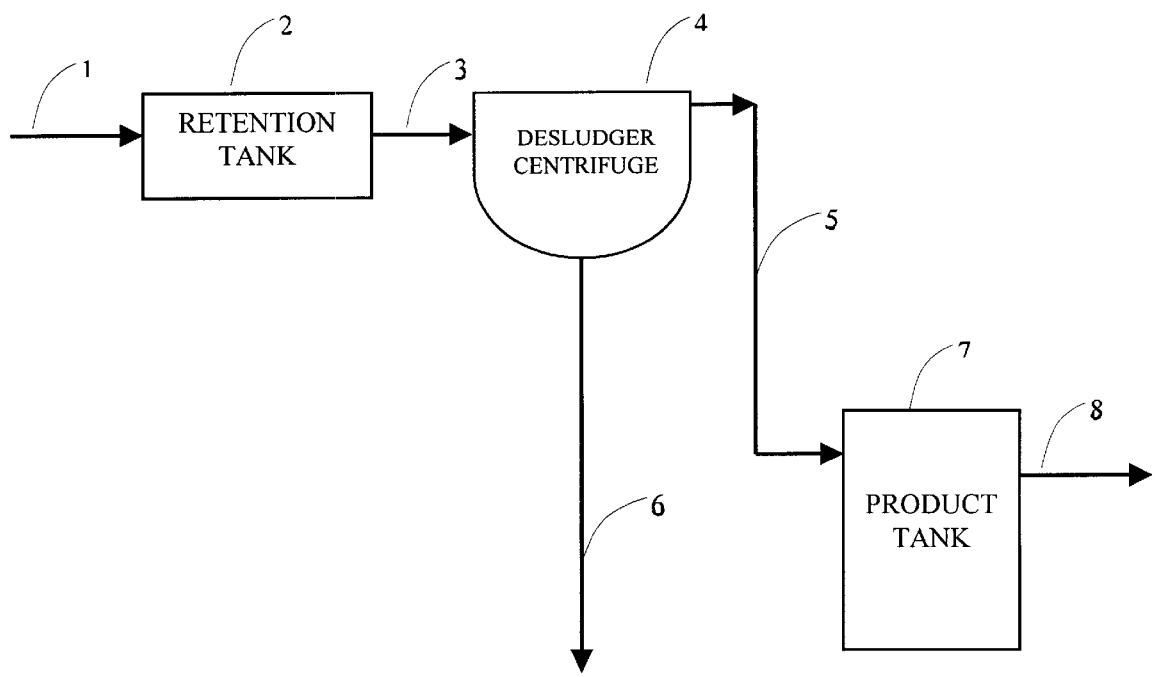
FIG. 2 is a simplified diagram illustrating the process of this invention.

Referring to FIG. 2, raw sulfur, containing substantial amounts of solids impurities (ash), such as at least about 10 ppm, and as much as 2,000 ppm or more, is introduced through conduit 1 into retention tank 2, which is a conventional piece of equipment. Typically, the ash content of the raw sulfur is in the neighborhood of 100 to 300 ppm. Both conduit 1 and retention tank 2 are provided with steam jackets or other suitable means for providing heat so as to maintain the temperature of the molten sulfur above about 250° F., and preferably between about 250° and 300° F. The original source of the sulfur being processed may be a natural deposit, such as those mined by the Frasch hot water injection technique or by other traditional mining techniques; or it may be sulfur that has been recovered from a gaseous hydrogen sulfide stream or similar sulfur-containing gaseous streams often found in oil refining operations and the like, and treated to remove the sulfur from the stream and recover it as a byproduct using a Claus Process or similar technique. One important aspect of the process of the present invention is its ability to handle recovered sulfur as well as run-of-mine sulfur, with only minor adjustments to its parameters and configurations needed in order to accommodate the differences in compositions and properties of the two types of sulfur. From retention tank 2, the molten sulfur may flow by gravity or be pumped through conduit 3 into desludger centrifuge 4, which is also provided with a steam jacket or some other suitable means for imparting enough heat so a to maintain the sulfur in its molten state. Desludger centrifuge 4 is preferably a Westfalia Model SB 60 clarifier centrifuge of the type shown schematically in FIG. 1, but it may be any type of disc centrifuge provided with conical discs and able to centrifuge liquids at high G forces as described above. Depending on the characteristics and throughput of the sulfur being processed and the size of the centrifuge bowl, the desludger centrifuge rotational speed should be adjusted so as to provide a centrifugal force of at least about 4,000, and preferably between about 4,000 and 12,000. It has been found that, if the centrifuge is operated within the range of centrifugal forces stipulated above, ash removal improves as the centrifugal force increases. Since the G force is a function of the rotational speed and the radius of the centrifuge bowl, the optimum process G force is limited only by the size of the equipment used and the strength of the stainless steel or other alloy used in the fabrication of the equipment. Desludger centrifuges tend to be smaller in size than nozzle bowl centrifuges and, therefore, in the process of this invention, are generally operated at higher G forces, e.g., in the 8,000 to 12,000 range, whereas nozzle bowl centrifuges, being larger in size, are generally operated at lower G forces, e.g., in the 4,000 to 8,000 range.

Continuing with the process illustrated in FIG. 2, the stream of molten sulfur fed through conduit 3 into desludger centrifuge 4 is subjected to high rotational speed centrifugation at a G force of about 9,300. Operating parameters in the desludger centrifuge should be controlled so as to provide a minimum retention time of about 1 second, and preferably between about 2 and 15 seconds. Depending on the nature of the feed stream and the magnitude of the G force being employed, retention times in the order of between about 10 and 15 seconds tend to provide very good separation. In general, the finer the solid impurities, the longer the retention times should be; while the higher the G force being employed, the shorter the retention time needs to be. Centrifugation in this fashion results in the separation of the incoming sulfur stream into a purified overflow stream 5, comprising between about 99 and 99.99% of the sulfur throughput, and a waste underflow stream 6, comprising between about 0.01 and 1% of the incoming feed stream. By operating under these controlled conditions, the process of this invention is able to reduce the ash concentration in the sulfur to anywhere from 5 to 40% of the incoming feed concentration, often resulting in an ash content of less than 25 ppm, and typically 10 to 15 ppm, in the centrifuge overflow stream ("centrifugate") 5, which is then conveniently sent to product tank 7 to be stored as final purified product 8. Underflow 6, containing as much as 350,000 ppm ash, and typically about 250,000 ppm, is then sent to waste disposal.

Figure 3:
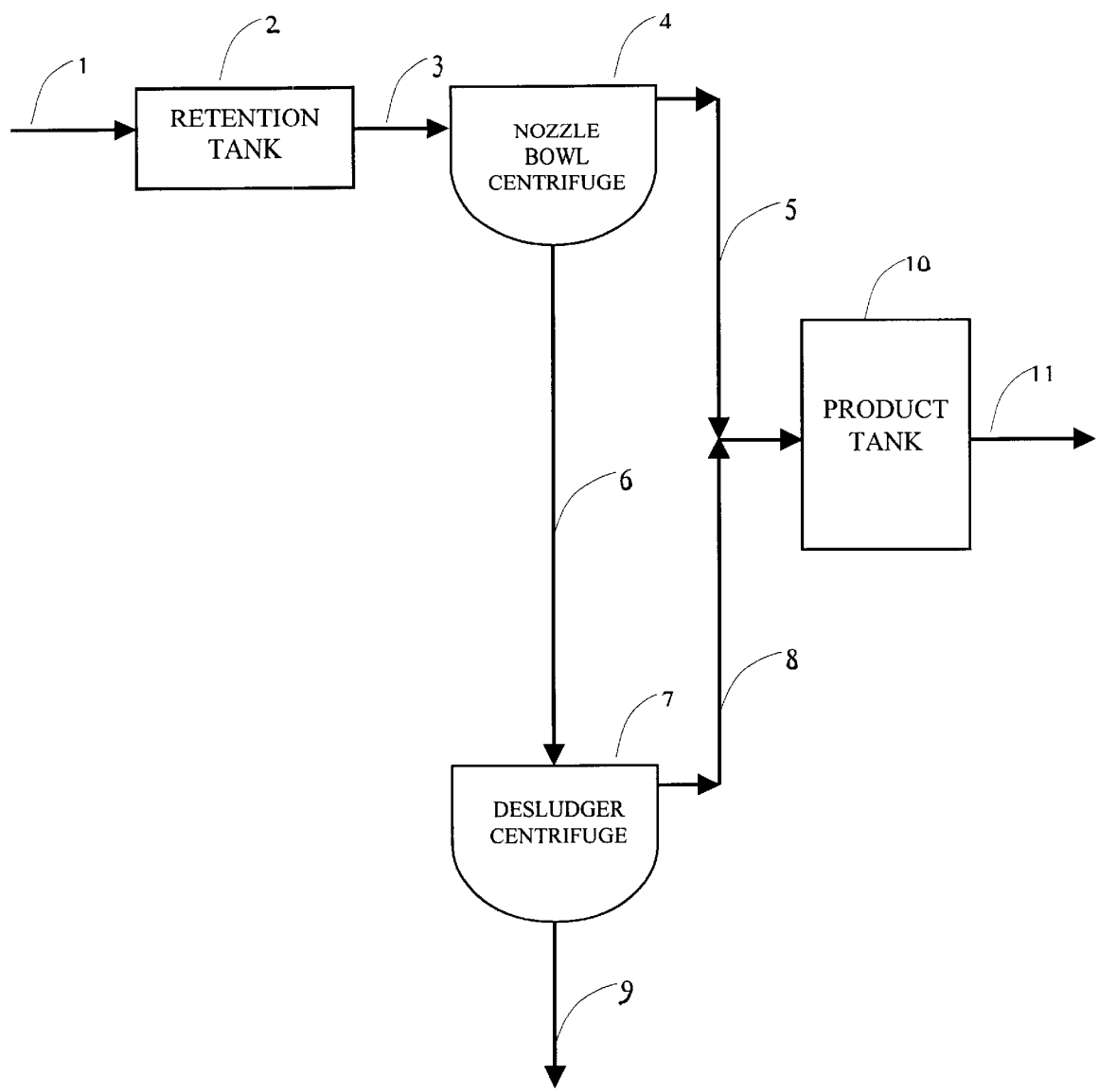
FIG. 3 is a simplified diagram illustrating one preferred embodiment of the process of this invention.

In certain cases, such as when purifying large volumes of sulfur, it may be desirable to first process the raw sulfur in one or more nozzle bowl centrifuges and then subject the high-solids sulfur underflow to further centrifugation in one or more desludger centrifuges. Such is the case depicted in the scheme of FIG. 3, where run-of-mine sulfur from a Frasch mine flows through insulated pipe 1 into retention tank 2, from where it is pumped into nozzle bowl centrifuge 4 through insulated pipe 3. Heating means are provided throughout the entire system so as to maintain a constant temperature of about 260° F. The rotational speed of the nozzle bowl centrifuge 4 is then adjusted so as to provide a G force of about 4,000 and, after retaining the sulfur in the centrifuge for at least 1 second (and preferably between about 2 and 20 seconds), reduce its ash content from about 100 ppm in the feed to the nozzle bowl centrifuge to about 10 to 15 ppm in the overflow stream 5 exiting the nozzle bowl centrifuge. When nozzle bowl centrifuge 4 is operated under these conditions, about 90% by weight of the incoming sulfur stream separates as overflow stream 5, while about 10% by weight of the incoming sulfur 3 reports as underflow 6 with an ash content of between about 1 to 2% solids (10,000 to 20,000 ppm). Underflow 6 is then fed to desludger centrifuge 7, where it is centrifuged at a G force of about 9,300 in order to generate a centrifugate stream 8 having a reduced ash content of about 10 to 12 ppm and an underflow waste stream containing about 250,000 ppm ash.

Figure 4:
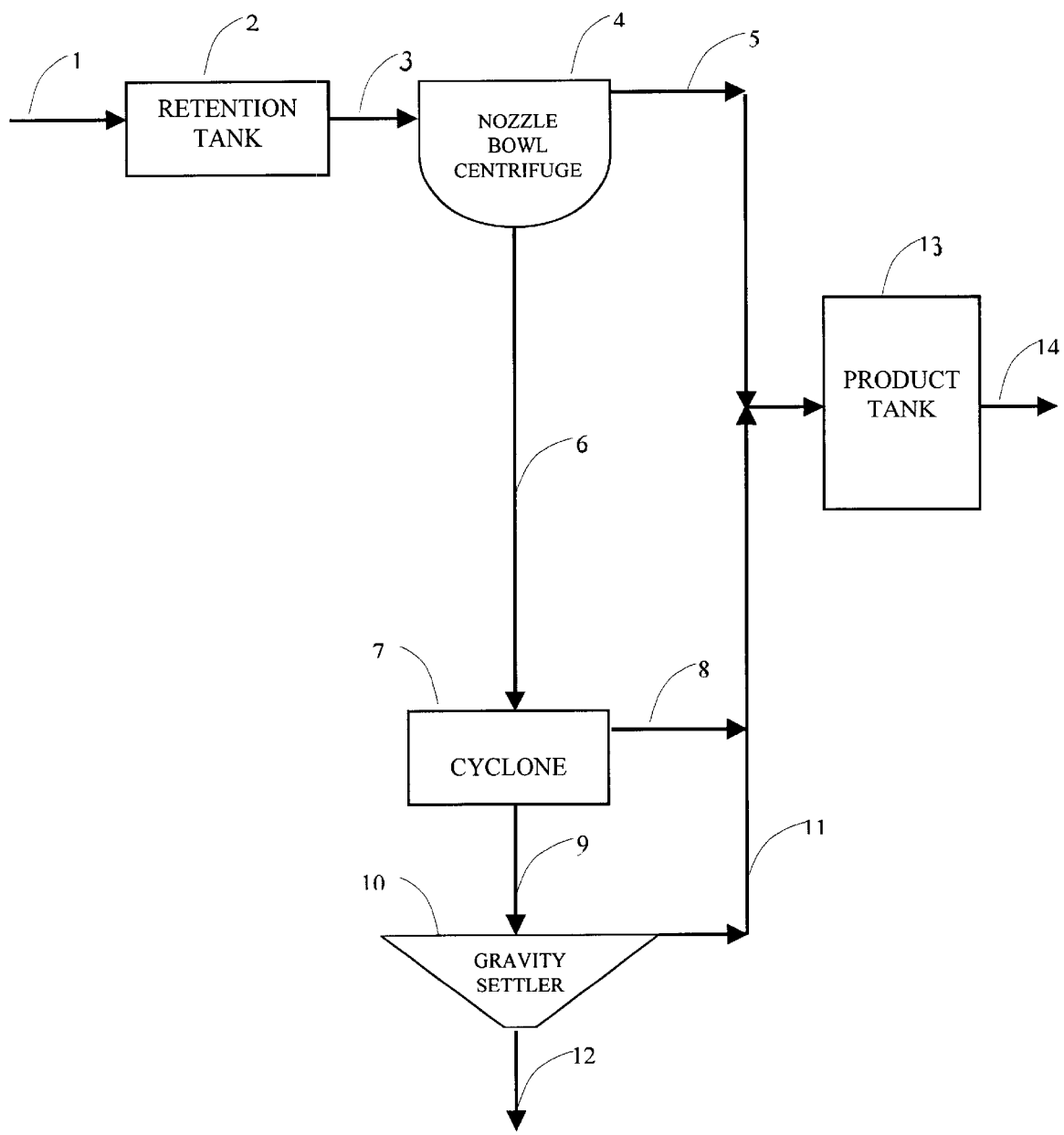
FIG. 4 is a simplified diagram illustrating another embodiment of the process of this invention.

Another embodiment of the present invention contemplates the use of gravity settling in conjunction with high G force centrifugation. This embodiment is shown in FIG. 4. The scheme depicted in FIG. 4 may be utilized by itself or as an adjunct to the scheme depicted in FIG. 3. If utilized by itself, as shown in FIG. 4, this embodiment entails the treatment of ash-containing sulfur 3 in a nozzle bowl centrifuge 4 in the same manner as described above in reference to the scheme of FIG. 3, but processing the centrifuge underflow 6 in a cyclone 7 to separate solids impurities which then proceed, as stream 9, to gravity settler 10 where they are further separated into overflow product stream 11 and underflow waste stream 12, which is sent to waste disposal. Gravity settler 10 may be a "thickener", i.e., a settler equipped with raking means to conveniently channel the solids through the underflow nozzle of the settler. The raw sulfur may be fed to steam jacketed retention tank 2 through conduit 1, as in the previous schemes. Overflow product stream 11 may be conveniently blended with cyclone overflow stream 8 and sent to product tank 13, where both streams are blended with nozzle bowl centrifuge overflow stream 5 to form a final purified sulfur product 14 containing minimum amounts of solid impurities. (In some cases, it may be desirable to return cyclone overflow stream 8 to the nozzle bowl centrifuge.) The use of this embodiment of the invention, by itself, is generally less effective in removing solid impurities than either of the processes described in FIG. 2 and 3; however, the scheme may suffice in some cases where a high degree of solids removal is not necessary. Alternatively, the gravity settler arrangement depicted in FIG. 4 (with or without cycloning) may be conveniently employed as an adjunct scheme to the process depicted in FIG. 3 and used to handle the underflow from nozzle bowl centrifuge 4 whenever desludger centrifuge 7 becomes unavailable, e.g., on account of maintenance or breakdown. By judicious manipulation of process flow rates, number and configurations of centrifuges, centrifuge speeds and the like, a skilled operator may avoid and/or minimize downtime in a commercial process by using this gravity settler arrangement in order to handle the sulfur stream that would be normally fed to the desludger centrifuge and still generate a sulfur product stream sufficiently low in solids to meet the market requirements of the ultimate sulfur product.

In order to more clearly disclose the nature of the present invention, specific examples of the practice of the invention will be given. It should be understood, however, that this is done solely by way of illustration, and is intended neither to delineate the scope of the invention nor limit the ambit of the appended claims.

EXAMPLE 1

Run-of-mine sulfur from a Frasch sulfur mine, having an average ash content of 79 ppm, was pumped from the storage tank where it was stored at a temperature of about 260° F. into the inlet nozzle of a Westfalia Model NA-7 desludger centrifuge. Model NA-7 was made of stainless steel, had a bowl diameter of 11 inches and a bowl volume of 3 liters, and was equipped with 72 discs. The desludger centrifuge was fitted with an external hot oil jacket to maintain the sulfur in molten state at a temperature between 250° F. and 260° F. High-temperature motor oil was used to impart the necessary heat. The rotational speed ("rotor speed") of the centrifuge was set at 7,700 revolutions per minute ("rpm"), thereby providing a G force of 8,500. Retention time for this operation was 3.17 seconds. The sulfur was fed at a rate of 6.0 long tons per hour for 132 minutes, during which the overflow centrifugate product continuously flowed through the centrifugate outlet port at a rate of 5,997 long tons per hour, or 99.96% of the incoming feed. The centrifugate was pumped into a heated product tank. The ash content of the centrifugate was 6 ppm. The NA-7 centrifuge was programmed to eject the high-solids-containing underflow at the end of 132 minutes. The ejected underflow, which amounted to 0.005 long tons, was collected, sampled and analyzed. Its ash content was 101,352 ppm.

EXAMPLE 2

Run-of-mine sulfur from a Frasch sulfur mine, with an ash content of 44 ppm, was first screened through a rotary strainer having a mesh of 0.8 mm so as to reject trash and foreign matter larger than 0.8 mm. The screened sulfur, at a temperature of about 260° F., was pumped into a nozzle bowl centrifuge manufactured by Dorr-Oliver Incorporated as Model CH-18B. The Dorr-Oliver Model CH-18B nozzle bowl centrifuge was made of stainless steel, had a bowl diameter of 18 inches and a bowl volume of 4.4 gallons, and was equipped with 48 discs. The centrifuge was first insulated with an insulation blanket, the rotor speed of the centrifuge was then set at 4,200 rpm, so as to provide a G force of 4,500, and hot motor oil, at around 300° F., was circulated through the centrifuge until the temperature inside the centrifuge bowl reached 260° F. The hot motor oil flow was then shut off, and the run-of-mine sulfur was continuously fed into the inlet port of the Model CH-18B nozzle bowl centrifuge at a rate of 40.4 long tons per hour. Retention time for this operation was 2.62 seconds. The centrifugate stream flowed continuously at a rate of 39.65 long tons per hour and had an ash content of 14 ppm. This centrifugate stream was sent to a product tank for storage. The high-solids-containing underflow from the Dorr-Oliver Model CH-18B nozzle bowl centrifuge exited the centrifuge continuously at a rate of 0.75 long tons per hour and had an ash content of 2,296 ppm. This stream was fed to a Westfalia Model NA-7 desludger centrifuge having the same features and specifications as those described in Example 1 above.

The rotor speed of the NA-7 was set at 7,700 rpm to provide a G force of 8,500. Retention time was 25.4 seconds. The NA-7 was operated under these conditions for 40 minutes, during which the overflow centrifugate was continuously discharged at a rate of 0.742 long tons per hour and pumped into the same product storage tank as the overflow from the nozzle bowl centrifuge. The ash content of the desludger centrifuge centrifugate was 27 ppm. The desludger centrifuge underflow, after 40 minutes, contained 156,316 ppm ash, and was sent to waste disposal. After operating in this fashion for 12 hours, the blended centrifugates in the product tank had a calculated ash content of 14.2 ppm.

EXAMPLE 3

Molten sulfur from a Frasch sulfur mine, with an ash content of 73 ppm, was first screened through a rotary strainer having a mesh of 0.8 mm so as to reject trash and foreign matter larger than 0.8 mm. The screened sulfur, at a temperature of about 260° F., was continuously fed to a stainless steel Dorr-Oliver Model CH-18B nozzle bowl centrifuge at a rate of 40.8 long tons per hour. An insulation blanket and a hot motor oil circulation system similar to the one described in Example 2, above, were used to maintain the temperature of the molten sulfur above 250° F. The CH-18B was operated for 24 hours at a G force of 4,500 and a retention time of 2.60 seconds. The centrifugate from this operation flowed at a rate of 39.6 long tons per hour and contained 13 ppm ash. This centrifugate stream was stored in a heated product tank. The underflow of the CH-18B exited the centrifuge at a rate of 1.16 long tons per hour and contained 1,607 ppm ash. This underflow was fed to a fabricated stainless steel gravity settler, with a diameter of 23.25 inches, to be further separated into 1.156 long tons per hour of an overflow stream, containing 1,334 ppm ash, and 0.0042 long tons per hour of an underflow stream, containing 57,000 ppm ash. Retention time in the settler was in the order of 5 hours. The overflow stream was sent to the product tank, while the underflow stream was sent to waste disposal. After 24 hours of operating in this fashion, the ash content of the blended streams in the product tank was 50 ppm.

EXAMPLE 4

Molten sulfur removed from a hydrogen sulfide stream in a Claus Plant was tested in order to confirm the applicability of the invention to the purification of recovered sulfur. Small amounts of sulfuric acid were added to the recovered sulfur in order to simulate the acidity exhibited by most commercial recovered sulfurs as a result of exposure to air during storage in solid state. The feed sulfur was first neutralized with lime, resulting in a sulfur high in calcium sulfate and unreacted lime. This feed stream, with an ash content of 150 ppm, was pumped from a heated retention tank into the inlet port of a Westfalia Model DA-40 nozzle bowl centrifuge. The DA-40 centrifuge was made of stainless steel, had a 20-inch diameter bowl and a bowl volume of 4.75 gallons, and was equipped with 64 discs. An insulation blanket and a hot motor oil circulation system similar to the one described in Example 2, above, were used to maintain the temperature of the molten sulfur above 250° F. The centrifuge's rotor speed was set at 4,500 rpm, so as to generate a G force of 5,660, and the sulfur was fed continuously for 30 hours at a rate of 28 long tons per hour. Retention time was 4.07 seconds. In this fashion, a centrifugate overflow was generated, which flowed at a rate of 19.4 long tons per hour and had an average ash content of 35 ppm. The generated high-solids underflow was removed at a rate of 8.6 long tons per hour and contained 409 ppm ash.

Although the invention has been described in terms of particular embodiments and applications, one of ordinary skill in the art, in light of this teaching, can generate additional embodiments and modifications without departing from the spirit or exceeding the scope of the claimed invention. Accordingly, it is to be understood that the drawings and descriptions herein are offered by way of example to facilitate comprehension of the invention and should not be construed to limit the scope thereof.

What is claimed is:

1. A process for purifying solid-impurities-containing molten sulfur, said solid impurities having a particle size ranging from about 5 to about 100 microns, comprising:

(a) feeding said solid-impurities-containing molten sulfur to a solid bowl centrifuge provided with a plurality of discs and capable of effecting centrifugal separation of solids from liquids at a G force of at least about 4,000;

(b) centrifuging said solid-impurities-containing molten sulfur in said solid bowl centrifuge at a G force of at least about 4,000 for a length of time sufficient to separate said solid-impurities-containing molten sulfur feed into a sulfur waste stream, containing at least about 1% by weight solids, and a purified sulfur product stream substantially free of solid impurities; and (c) removing said purified sulfur product stream from said solid bowl centrifuge.

2. A process as claimed in claim 1, wherein said centrifugation is conducted in one or more desludger centrifuges.

3. A process as claimed in claim 1, wherein said centrifugation is conducted in one or more nozzle bowl centrifuges.

4. A process as claimed in claim 3, wherein said centrifugation is conducted in two or more nozzle bowl centrifuges, said two or more nozzle bowl centrifuges are operated in parallel under a G force of between about 4,000 and 12,000, and said centrifugation is conducted at a temperature of at least 240° F.

5. A process as claimed in claim 3, further comprising subjecting the separated underflow stream of solid impurities to centrifugation in one or more desludger centrifuges.

6. A process as claimed in claim 1, wherein said solid impurities-containing molten sulfur contains at least about 10 ppm of said solid impurities.

7. A process as claimed in claim 6, wherein said solid impurities-containing sulfur contains between about 10 and 2,000 ppm of said solid impurities.

8. A process as claimed in claim 1, wherein said centrifugation is conducted at a temperature of at least 240° F.

9. A process as claimed in claim 8, wherein said temperature is between about 250° F. and 300° F.

10. A process as claimed in claim 1, wherein said G force is less than about 12,000.

11. A process for purifying solid-impurities-containing molten sulfur, said solid impurities having a particle size ranging from about 5 to about 100 microns, comprising: (i) subjecting said solid-impurities-containing molten sulfur to centrifugation at a G force of at least about 4,000 in one or more nozzle bowl centrifuges while in a molten state; (ii) separating the centrifuged molten sulfur into a first purified sulfur overflow stream and a first impurity-loaded underflow stream containing at least about 1% by weight solids; (iii) subjecting said first impurity-loaded underflow stream to centrifugation in one or more desludger centrifuges at a temperature of at least 250° F.; and (iv) separating the centrifuged first impurity-loaded underflow stream into a second purified sulfur overflow stream and a second impurity-loaded underflow stream.

12. A process as claimed in claim 11, further comprising blending said first purified sulfur overflow stream from said one or more nozzle bowl centrifuges with said second purified sulfur overflow stream from said one or more desludger centrifuges to thereby generate a purified sulfur product substantially free of solid impurities.

13. A process as claimed in claim 11, wherein said sulfur being purified contains at least about 100 ppm of said solid impurities.

14. A process as claimed in claim 13 wherein said one or more nozzle bowl centrifuges are operated under a G force of less than about 12,000.

15. A process as claimed in claim 13, wherein said one or more desludger centrifuges are operated under a G force of less than about 12,000.

16. A process for purifying solid-impurities-containing molten sulfur, said solid impurities having a particle size ranging from about 5 to about 100 microns, comprising: (i) subjecting said solid-impurities-containing molten sulfur to centrifugation in one or more nozzle bowl centrifuges at a G force of at least about 4,000 while maintaining the temperature of the sulfur above about 250° F.; (ii) separating the centrifuged molten sulfur into a first purified sulfur centrifugate stream and a first impurity-loaded underflow stream containing at least about 1% by weight solids; (iii) subjecting said first impurity-loaded underflow stream to gravity separation while maintaining the temperature of said impurity-loaded underflow stream above about 250° F.; and (iv) separating the gravity separated first impurity-loaded underflow stream into a second purified sulfur overflow stream and a second impurity-loaded underflow stream.

17. A process as claimed in claim 16, further comprising blending said first purified sulfur centrifugate stream from said one or more nozzle bowl centrifuges with said second purified sulfur overflow stream from said gravity separation step while maintaining the temperature of said first purified sulfur centrifugate stream and second purified sulfur overflow stream above about 250° F. to thereby generate a purified sulfur product substantially free of solid impurities.

* * * * *